July 17, 1923.

G. A. CHEREMISINOFF

SHOCK ABSORBING DISK WHEEL

Filed Feb. 23, 1923

Inventor

GABRIEL A. CHEREMISINOFF

By Charles E. Wiser

Attorney

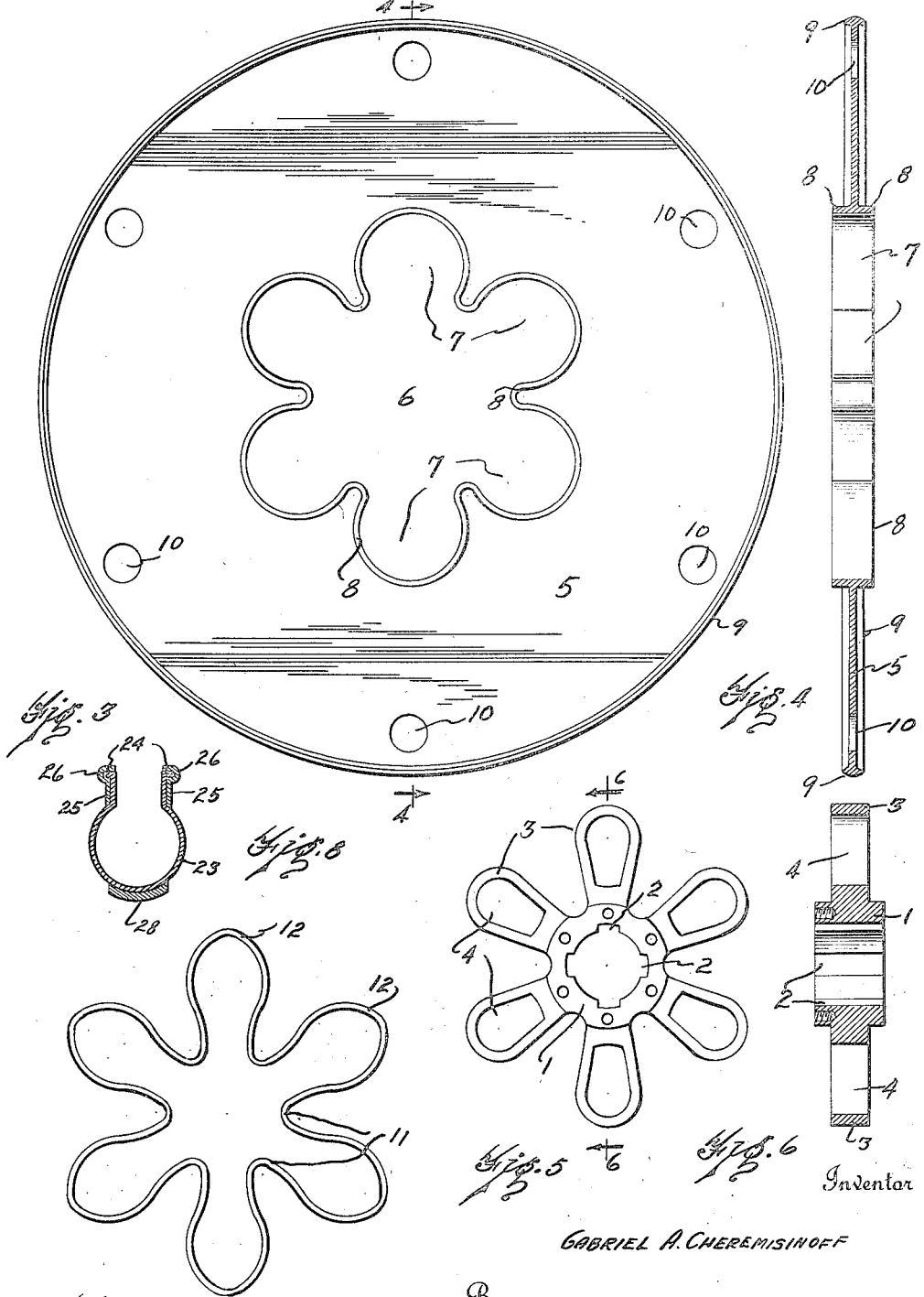

Patented July 17, 1923.

1,461,969

UNITED STATES PATENT OFFICE.

GABRIEL A. CHEREMISINOFF, OF HIGHLAND PARK, MICHIGAN.

SHOCK-ABSORBING DISK WHEEL.

Application filed February 23, 1923. Serial No. 620,768.

*To all whom it may concern:*

Be it known that I, GABRIEL A. CHEREMISINOFF, a citizen of Russia, residing at Highland Park, county of Wayne, State of Michigan, have invented a certain new and useful Improvement in Shock-Absorbing Disk Wheels, and declare the following to be a full, clear, and exact description of the same, such as will enable others skilled in the art to which it pertains to make and use the same, reference being had to the accompanying drawings, which form a part of this specification.

This invention relates to shock absorbing disk wheels and the principal object of the invention is to provide a resilient wheel of all metal construction having a flexible composition tread. A further object of the invention is to provide a shock absorbing disk wheel having greater inherent strength than the present wheels and at the same time providing a wheel of pleasing appearance. Another object of the invention is to provide a shock absorbing disk wheel having a resilient metal periphery thus doing away with the possibility of punctures or blowouts and preventing the possibility of throwing a tire when traveling at a high rate of speed. Another object of the invention is to provide a shock absorbing disk wheel which will not bound when going over rough roads and thus has an advantage over an ordinary wheel provided with a pneumatic tire. A further object of the invention is to provide a shock absorbing disk wheel in which the driving connection with the wheel is flexible allowing the wheel to turn slightly in relation to the driving axle thus relieving strain on the axles, differential, propeller shaft and universal joints of the usual automobile with which the wheels are used. Another advantage of the flexible connection is that when the brakes are suddenly applied the wheels are not immediately locked but may turn slightly in relation to the respective axle. These objects and the several novel features of the invention are hereinafter more fully described and claimed and the preferred form of construction by which these objects are attained is shown in the accompanying drawings in which—

Fig. 3 is an elevation of the interior or driven disk of the wheel.

Fig. 4 is a section taken on line 4—4 of Fig. 3.

Fig. 5 is an elevation of the driving hub.

Fig. 6 is a section therethrough taken on line 6—6 of Fig. 5.

Fig. 7 is an elevation of the flexible driven shock absorbing spring.

Fig. 8 is a section through the metal tire.

Figure 1:
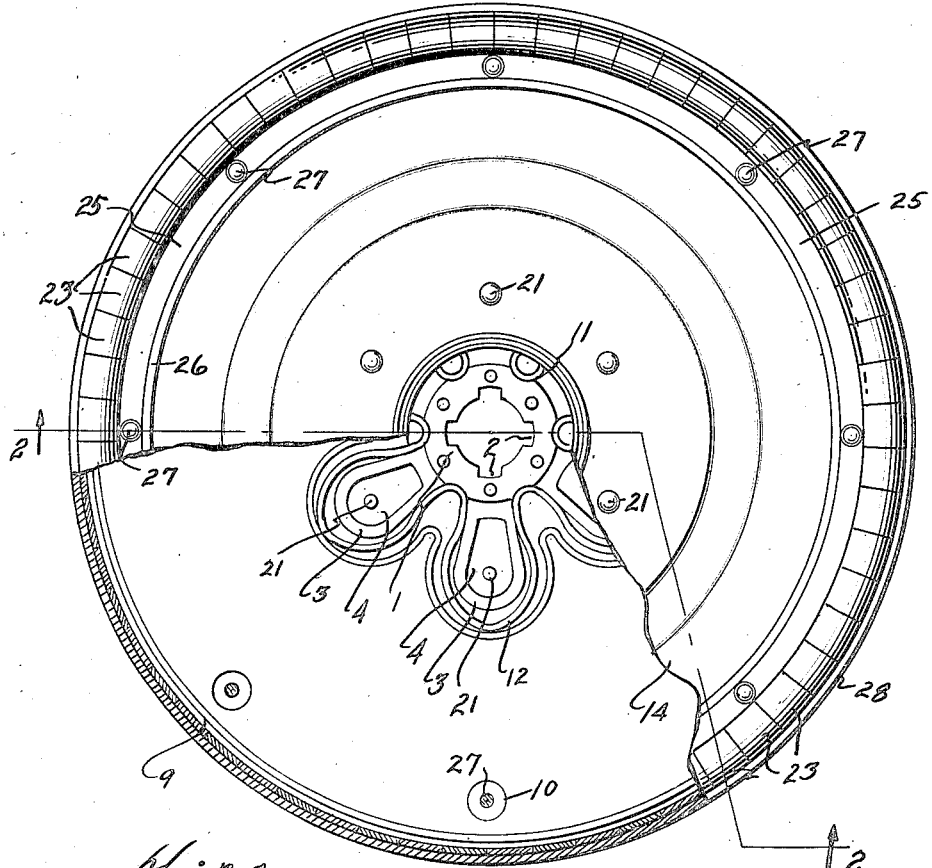
Fig. 1 is an elevation of the wheel partly broken away to show the interior construction.
Figure 2:
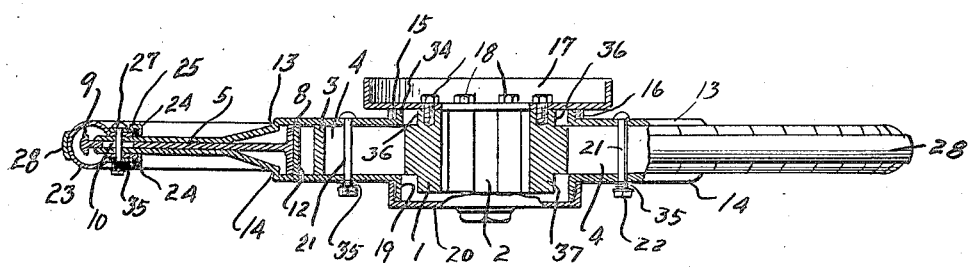
Fig. 2 is a section taken on line 2—2 of Fig. 1.

The wheel comprises a hub portion 1 which is provided with grooves 2 to fit splines provided on the driving axle. This hub 1, as shown in Figs. 5 and 6, is provided with a series of radially extending lugs 3 having openings 4 through the center thereof. The driven disk 5 shown in Figs. 1, 3 and 4 is provided with an aperture 6 at the center having a series of notches 7 open to the central aperture as shown. This disk 5 is provided with a flange 8 on each side about the notches 7 and central aperture 6 as shown more particularly in Figs. 3 and 4. The disk 5 is provided with a peripheral flange 9 and with a series of apertures 10 adjacent the periphery. A driving and shock absorbing spring 11 shown in Fig. 7 is provided formed of spring steel of the shape shown in Figs. 1 and 7, and is adapted to be positioned with the portions 12 thereof extending into the notches 7 provided in the driven disk 5 as shown in Fig. 1. The hub is positioned in the central aperture 6 of the disk 5 as shown in Fig. 1 with the lugs 3 extending within the spaces within the portions 12 of the driving and shock absorbing spring. As shown in Fig. 2, a pair of outer disks 13 and 14 are provided for the wheel. The inner side of the outer disk 13 at the center fits about the flange 8 of the disk 5, the spring 11 and lugs 3 of the hub 1 and at the hub is provided with an outwardly extending annular flange 34. A felt washer 15 is positioned about the flange 34 and is clamped tightly in place by the steel band 16. A brake drum 17 is secured to the hub 1 by the bolts 18 and the felt washer 15 prevents leakage of grease between the flange 34 and the brake drum 17. The outer disk 14 is also formed to fit about the driving lugs, driving spring 11 and flange 8 of the disk 5 and is provided with an outwardly extending annular flange 19 at the center which is threaded on the exterior to receive the hub cap 20. The hub 1 is provided with annual shoulders 36 and 37 and the annular flanges 19 and 34 of the disks 14 and 13 are adapted to engage the annular shoulders 36 and 37 when an extra heavy shock is given to the periphery of the wheel thus preventing breakage of the spring 11. The disks 13 and 14 are bolted together by the bolts 21 which extend through the apertures 4 in the lugs 3 as shown in Figs. 1 and 2 and a special spring washer 35 is positioned between the nuts 22 and the adjacent disk so that considerable tension may be placed on the disks by adjusting the nuts 22. The disks 13 and 14 near the periphery contact the outer faces of the driven disk 5 and terminate short of the peripheral flange 9 of the said driven disk. The tire as shown in Figs. 1, 2 and 8 is made up of a series of spring steel members 23 having outturned flanges 24 at the edges as shown more particularly in Figs. 2 and 8, and a pair of annular members 25 shown in Figs. 1, 2 and 3 are provided having an annular groove 26 to receive the flanges 24. These annular members 25 are bolted together on opposite sides of the wheel by the bolts 27 shown in Figs. 1 and 2 and these bolts are provided with special spring washers to yieldably hold the parts in place, the bolts 27 extending through the apertures 10 provided in the driven disk 5 which are considerably larger in diameter than the diameter of the bolts 27 and by means of the special spring washers 35 the bolts 27 are adjustable to vary the tension between the disks 13, 5 and 14. When the spring steel members 23 are secured in place, as shown in Figs. 1 and 2, the tread of the wheel is covered with a flexible composition 28 which prevents the wheel from becoming noisy when traveling over hard pavements.

When the wheel is secured to the axle by fitting the hub 1 over the splines provided on the axle, rotation of the axle turns the hub 1 and lugs 3 which forces the sides of the portions 12 of the spring 11 against the flanges 8 about the notches 7. This allows the hub to turn slightly before the wheel is rotated and thus relieves strain on the driving axle as well as on the differential, propeller shaft and universal joints, the pressure applied to the driven disk increasing as the hub and lugs are turned. When the driving lugs 3 start to move the driven disk 5, the said disk 5 may move slightly due to the apertures 10 being larger in diameter than the diameter of the bolts 27 and the friction between the disks 13, 14 and 5 takes up some of the shock of starting the outer disks to rotate. By tightening the bolts 21 and 27 the tension between the driven disk 5 and outer disks 13 and 14 may be increased through the spiral spring washers 35 to the desired extent. This yieldable action of the disks, spring and hub takes place irrespective of the direction in which the hub is rotated and thus the action is the same in reverse as in driving forward. When the wheels are mounted on the automobile axles the weight of the automobile causes the tire members 23 to flatten slightly and contact the peripheral flange 9 of the driven disk 5. When the wheel is passing over rough roads and shock imparted to the tire members 23 in contact with the road forces the driven disk 5 upwardly and compresses the lower portion 12 of the spring 11 and causes it to take the form of the lower notch 7, the spring 11 taking up considerable of the shock without causing the wheel to bound. Due to the enlarged apertures 10, the disk 5 may move upwardly to considerable extent but this upward movement is resisted by the disks 13 and 14 which contact the faces of the disk 5 with considerable tension so that upward movement of the said disk is resisted by the friction which absorbs considerable of the shock. By tightening the bolts 21 and 27 this friction or tension between the disks may be increased to support greater loads and allow the wheel to be used on automobiles of different weights. As the space between the disks 13 and 14 is filled with grease the operation of the different parts may be easily accomplished and the friction of the disks 13 and 14 on the driven disk 5 tends to absorb considerable of the shock imparted to the driven disk. With the construction shown there is no danger of throwing a tire when traveling at high rate of speed and, due to the action of the disk wheel and spring construction, the shocks are absorbed without causing the wheel to bound. This construction may also be applied to the front wheels of the automobile but could be changed slightly as the wheel may rotate freely on the front axle and does not therefore require a driving connection.

From the foregoing description it becomes evident that the device is very simple and efficient in operation, will not easily get out of order, is of strong flexible construction and provides a device which accomplishes the objects described.

Having thus fully described my invention, its utility and mode of operation, what I claim and desire to secure by Letters Patent of the United States is—

1. A shock absorbing disk wheel comprising a driving hub having a series of lugs formed integrally therewith and extending radially therefrom, a steel shock absorbing spring extending about and between the lugs of the hub, a driven disk provided with a central aperture for the hub and a series of notches opening thereinto for receiving the lugs of the hub and the steel shock absorbing spring, the said disk being provided with a flange about the said notches adapted to be engaged by the spring, the said disk being also provided with a peripheral flange, a pair of outer disks secured on opposite sides of the driven disk, the said outer disks being movable in relation to the hub and terminating short of the peripheral flange of the driven disk, a series of spring steel tire portions fitting about the edges of the outer disks and enclosing the peripheral flange of the driven disk, the tire portions being provided with outwardly extending flanges, and a pair of annular members engaging over the outwardly extending flanges of the tire portions and bolted together through the disks, the driven disk being provided with enlarged apertures to receive the said bolts.

2. A shock absorbing disk wheel comprising a driving hub adapted to be secured to the driving axle of an automobile, a series of lugs formed integrally with and extending radially from the said hub, a steel spring shaped to extend about and between the said lugs, a driving disk having a central aperture and a series of notches opening thereinto adapted to fit about the lugs of the hub and the steel spring, a pair of outer disks secured on opposite sides of the driven disk and enclosing the lugs of the hub and the steel spring, the space between the outer disks being adapted to be packed with grease, the periphery of the driven disk extending beyond the peripheries of the outer disks, and a spring metal tire secured to the outer disks and extending about the periphery of the driven disk.

3. A shock absorbing disk wheel comprising a driving hub having a series of lugs formed integrally therewith and extending radially therefrom, a steel spring extending about and between the lugs of the hub, a driven disk provided with a central aperture for the hub and a series of notches opening thereinto for receiving the lugs of the hub and the steel spring, the said disk being provided with a peripheral flange and with a flange about the said notches adapted to be engaged by the spring, a pair of outer disks engaging the opposite sides of the driven disk between the flanges, means for varying the tension between the outer and driven disks and a flexible tire portion adapted to engage the peripheral flange of the driven disk on the lower side when a weight is placed on the wheel.

4. A shock absorbing disk wheel comprising a driving hub having a series of lugs formed integrally therewith and extending radially therefrom, a shock absorbing driven steel spring extending about the lugs of the hub and normally spaced therefrom, a driven disk provided with a central aperture for the hub and a series of notches opening thereinto for receiving the lugs of the hub and the shock absorbing steel spring, the said disk being provided with a flange about the said notches adapted to be engaged by the spring, the said disk being also provided with a peripheral flange, a pair of outer disks secured on opposite sides of the driven disk and terminating short of the peripheral flange of the driven disk, and a tire comprising a series of spring steel portions secured to the edges of the outer disks and enclosing the peripheral flange of the driven disk.

5. A shock absorbing disk wheel comprising a driving hub having a series of lugs formed integrally therewith and extending radially therefrom, a shock absorbing steel spring extending about the lugs of the hub and normally spaced therefrom, a driven disk provided with a central aperture for the hub and a series of notches opening thereinto for receiving the lugs of the hub and the shock absorbing steel spring, the said disk being provided with a flange about the said notches adapted to be engaged by the spring, the said disk being also provided with a peripheral flange, a pair of outer disks secured on opposite sides of the driven disk and terminating short of the peripheral flange of the driven disk, the outer disks being each provided with an outturned annular flange at the center and the driving hub being provided with an annular shoulder on each side forming a stop against which the respective flange is adapted to engage, the annular shoulders being normally in concentric spaced relation with the annular flanges, and a tire comprising a series of spring steel portions secured to the edges of the outer disks at the periphery and enclosing the peripheral flange of the driven disk.

In testimony whereof, I sign this specification.

GABRIEL A. CHEREMISINOFF.